United States Patent Office 3,034,962
Patented May 15, 1962

3,034,962
ANTI-BACTERIAL COMPOSITION CONTAINING 6 - ACETOXY - MERCURICHOLESTEROL AND METHOD OF USE
Francis X. Gassner and Cyrus O. Guss, Colorado State University, Fort Collins, Colo.
No Drawing. Filed May 2, 1960, Ser. No. 25,875
4 Claims. (Cl. 167—71)

The present invention relates to novel compositions of matter and novel methods relating thereto, and more specifically to therapeutic compositions containing 6-acetoxymercuricholesterol as an essential ingredient and methods of preparing and using the same.

During the search for improved anti-bacterial agents it was decided to prepare a mercury derivative of cholesterol and test the resulting product for bactericidal properties. The product prepared was 6-acetoxymercuricholesterol, i.e. cholesterol with a

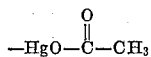

group at the 6-position. It was discovered that this product was insoluble in water but soluble in oils and, in solution form, that it was a potent anti-bacterial agent of particular value for use in the veterinarian field.

The following example will serve to illustrate the invention.

*Example.*—A hot solution of 12.5 g. (0.032 mole) cholesterol (Fisher, reagent grade) in 25 ml. glacial acetic acid is added to a hot, stirred solution of 31 g. (0.097 mole) mercuric acetate (Mallinckrodt, analytical grade) in 25 ml. glacial acetic acid.

This mixture is stirred at reflux temperature. After about one minute some mercurous acetate begins to precipitate. Exactly six minutes after this precipitate appears the mixture is cooled in iced water and the mercurous acetate removed by suction filtration, using minimal amounts of glacial acetic acid to aid the transfer and washing.

The reddish-colored filtrate is next poured slowly into 600 ml. water with rapid stirring and the resulting slurry stirred 30 minutes. The yellow solid is filtered by suction, and the solid then triturated in water with a pestle in a large casserole. This breaks up any lumps present.

The solid is next redispersed in 400 ml. water, allowed to stand overnight, then filtered by suction. Again the solid is redispersed in 400 ml. water by stirring ten minutes and filtered by suction. After three or four such redispersions, the aqueous filtrate no longer gives a positive test (orange color) for mercuric ion when four drops of a solution of 0.5 g. gallic acid in 10 ml. alcohol is added to three ml. of the filtrate. After this point is reached, the solid is redispersed in water three times more to assure complete removal of inorganic mercury salts. This washed solid is dried under vacuum over anhydrous calcium chloride to constant weight.

The product prepared as described above is a finely divided, light yellow powder which, when viewed under the microscope, appears to be somewhat amorphous. Melting point determinations using the Kofler Micro Hot Stage apparatus, shows all of the sample of the product to have melted and to be in the form of a yellow liquid between 115–118° C., with apparent softening at 103–105° C. Mercury content for $C_{29}H_{48}O_3Hg$: Theory 31.0%; found 30.9%.

The 6-acetoxymercuricholesterol of the present invention is soluble in oils including mineral or hydrocarbon oils and fatty oils including vegetable and animal oils. An example of a preferred composition is a paraffin oil solution containing sufficient 6-acetoxymercuricholesterol to provide the solution with 0.05 to 0.1% of Hg. Another example is a similar type oil solution but made up of about equal amounts of paraffin oil and cottonseed oil. With paraffin oil solutions and using the modified cup technique, solutions containing 0.1% Hg were found to strongly inhibit *Streptococcus hemolyticus* and *Pseudomonas aeruginosa* and to inhibit to a substantial extent *Staphylococcus aureus*, *E. coli* and Salmonella. Solutions containing 0.05% Hg were also found to strongly inhibit *S. hemolyticus* and *P. aeruginosa* and the other organisms to a lesser extent than the more concentrated solution. Solutions containing 0.01% and 0.005% Hg while less effective were effective against *P. aeruginosa*. Control tests using the oil only proved the oil to be non-inhibitory.

The oil solutions of the 6-acetoxymercuricholesterol of the present invention containing about 0.05–1.0% Hg can be advantageously used as anti-bacterial agents and have proven outstanding in the treatment of cows suffering from mastitis, endometritis and cystitis. Other veterinary applications are the treatment of fistula of the withers and poll-evil, or after dehorning by an aerosol spray of the oil solution, treatment of foot rot and other infections of the foot of hoofed animals. The oil solutions can also be advantageously combined with antibiotics such as anti-fungal antibiotics and particularly nystatin. More concentrated oil solutions can be used if desired but their use is contra indicated as adequate antibacterial activity is readily obtainable with solutions containing 0.05–0.1% Hg. The oil solutions can also be incorporated into ointment bases, used in emulsion form, etc.

The following examples of preferred formulations will further serve to illustrate the invention.

*Example A.*—32.4 mg. of 6-acetoxymercuricholesterol, prepared as described in the above example, is first dissolved in 50 ml. of cottonseed oil with heating to 60° C. and then sufficient mineral oil (about 50 ml.) is added with stirring to the resulting solution to provide 100 ml. This composition contains about 0.01% Hg.

*Example B.*—This composition is prepared in accordance with Example A with cottonseed oil and mineral oil using 162 mg. of the acetoxy compound. It contains about 0.05% Hg.

*Example C.*—This composition is prepared in accordance with Example A using 324 mg. of the acetoxy compound. It contains about 0.1% Hg.

*Example D.*—This example follows the procedures of the above examples except that 200 mg. of hydrocortisone acetate is added to the oil solution of the acetoxy compound to provide about 20 mg. of hydrocortisone acetate in a 10 ml. dose at each concentration. Other anti-inflammatory agents can also be incorporated in compositions of the acetoxy compound.

*Example E.*—324 mg. of the acetoxy compound in powdered form is first mixed with stirring in 50 ml. of lanolin heated to about 60° C. The resulting mixture containing some of the acetoxy compound in solution and some in dispersion is next mixed with stirring with 5 ml. of Carbowax (polyethylene glycol 400) at 60° C. The resulting ointment on cooling solidifies and contains about 0.1% Hg. Equivalent type compositions can be prepared using water soluble polyethylene glycol 1000, lanolin or like fatty oil, and water. The acetoxy compound in this case is in emulsion form and can be used for topical applications in the same manner as the oil solutions and ointments.

The percentages (%) of mercury (Hg) set forth above, and in the claims, are expressed, in accordance with standard practices in the pharmaceutical art, on a weight/volume (w./v.) basis. For example, in Example C above, 324 mg. of the acetoxy compound containing 30.9% Hg contains about 100 mg. (0.1 g.) of Hg. The 100 ml. of composition of Example C thus contains a total of 0.1 gram of Hg and, on the standard w./v. basis, 0.1% Hg. The same applies to the other illustrative examples.

It is claimed:

1. An anti-bacterial composition containing 6-acetoxymercuricholesterol carried in an inert pharmaceutical diluent.

2. A composition in accordance with claim 1 in which the carrier is an inert oil and the composition contains on a w./v. basis about 0.05–0.1% Hg.

3. A composition in accordance with claim 1 where the carrier is an ointment base and the composition contains on a w./v. basis about 0.05–0.1% Hg.

4. The method of controlling bacterial infections which comprises topically applying to the side of the infection 6-acetoxymercuricholesterol carried in an inert pharmaceutical diluent.

No references cited.